US008043985B2

(12) United States Patent
Yagi et al.

(10) Patent No.: US 8,043,985 B2
(45) Date of Patent: *Oct. 25, 2011

(54) CRYSTALLIZED GLASS, AND METHOD FOR PRODUCING CRYSTALLIZED GLASS

(75) Inventors: Toshitaka Yagi, Sagamihara (JP); Naoyuki Goto, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 464 days.

This patent is subject to a terminal disclaimer.

(21) Appl. No.: 11/806,875

(22) Filed: Jun. 5, 2007

(65) Prior Publication Data

US 2007/0293386 A1 Dec. 20, 2007

(30) Foreign Application Priority Data

Jun. 6, 2006 (JP) ................................ 2006-156877

(51) Int. Cl.
C03C 10/14 (2006.01)
(52) U.S. Cl. ................................. 501/4; 501/7
(58) Field of Classification Search .................... 501/4, 7
See application file for complete search history.

(56) References Cited

U.S. PATENT DOCUMENTS

| | | | | |
|---|---|---|---|---|
| 5,173,453 | A * | 12/1992 | Beall et al. ..................... | 501/4 |
| 6,197,710 | B1 * | 3/2001 | Ohara et al. ................... | 501/4 |
| 6,383,645 | B1 * | 5/2002 | Goto et al. ..................... | 428/426 |
| 6,750,167 | B2 * | 6/2004 | Kitamura et al. .............. | 501/4 |
| 6,930,289 | B2 | 8/2005 | Siebers et al. | |
| 7,262,144 | B2 * | 8/2007 | Schreder et al. ............... | 501/66 |
| 7,465,686 | B2 * | 12/2008 | Comte ............................ | 501/4 |
| 7,473,660 | B2 * | 1/2009 | Comte ............................ | 501/4 |
| 7,476,633 | B2 * | 1/2009 | Comte et al. ................... | 501/7 |
| 7,645,714 | B2 * | 1/2010 | Kawashima et al. ........... | 501/4 |
| 2002/0010063 | A1 * | 1/2002 | Schweiger et al. ............ | 501/5 |
| 2004/0180773 | A1 * | 9/2004 | Schreder et al. ............... | 501/7 |
| 2005/0096208 | A1 | 5/2005 | Zachau et al. | |
| 2007/0281849 | A1 * | 12/2007 | Yagi et al. ..................... | 501/4 |
| 2009/0162608 | A1 * | 6/2009 | Yagi et al. ..................... | 428/141 |

FOREIGN PATENT DOCUMENTS

| | | | |
|---|---|---|---|
| CN | 1676484 A1 | | 10/2005 |
| DE | 19816380 | * | 10/1999 |
| DE | 19939787 | * | 2/2001 |
| EP | 0156479 A1 | | 10/1985 |
| EP | 1114803 A | | 7/2001 |
| JP | 47-4198 S | | 2/1972 |

(Continued)

OTHER PUBLICATIONS

Patent Abstract of Japan, Publication No. 2005-053711, published on Mar. 3, 2005.

(Continued)

*Primary Examiner* — Karl Group
(74) *Attorney, Agent, or Firm* — Westerman, Hattori, Daniels & Adrian, LLP

(57) ABSTRACT

Provided are $SiO_2$—$Al_2O_3$-based or $Li_2O$—$Al_2O_3$—$SiO_2$-based crystallized glass which has various properties intrinsic to the crystallized glass of the type and which contains an arsenic component or an antimony component in an amount as small as possible or does not contain an arsenic component and an antimony component; and a method for producing the crystallized glass. The crystallized glass contains components of $SiO_2$ and $Al_2O_3$ (as oxides) and contains an $SnO_2$ component (as oxide) and/or a $CeO_2$ component (as oxide). Preferably, the glass contains from 0.01 to 5.0% (as oxide) of an $SnO_2$ component and/or from 0.01 to 5.0% (as oxide) of a $CeO_2$ component.

16 Claims, 2 Drawing Sheets

FOREIGN PATENT DOCUMENTS

| | | | |
|---|---|---|---|
| JP | 72004198 | * | 2/1972 |
| JP | 64-052631 A | | 2/1989 |
| JP | 09169542 | * | 6/1997 |
| JP | 11100229 | * | 4/1999 |
| SU | 1717568 | * | 3/1992 |

OTHER PUBLICATIONS

Patent Abstract of Japan, Publication No. 08-133783, published on May 28, 1996.
Patent Abstract of Japan, Publication No. 2000-247681, published on Sep. 12, 2000.
Patent Abstract of Japan, Publication No. 2001-354446, published on Dec. 25, 2001.
Patent Abstract of Japan, Publication No. 2001-354445, published on Dec. 25, 2001.
Patent Abstract of Japan, Publication No. 2001-354443, published on Dec. 25, 2001.
Patent Abstract of Japan, Publication No. 2002-326837, published on Nov. 12, 2002.
Patent Abstract of Japan, Publication No. 2005-089272, published on Apr. 7, 2005.
Search Report of corresponding European application EP 07 01 0986 mailed on Sep. 14, 2007.
Chinese Office Action dated Feb. 5, 2010, issued in corresponding Chinese Patent Application No. 200710110641.2.
Chinese Office Action dated Sep. 15, 2010, issued in corresponding Chinese Patent Application No. 200710110641.2.

* cited by examiner

US 8,043,985 B2

CRYSTALLIZED GLASS, AND METHOD FOR PRODUCING CRYSTALLIZED GLASS

BACKGROUND OF THE INVENTION

1. Field of the Invention

The present invention relates to $SiO_2$—$Al_2O_3$-based or $Li_2O$—$Al_2O_3$—$SiO_2$-based crystallized glass, and to a method for producing it. In particular, the invention relates to such crystallized glass that has wide-range applications as various precision parts severely required to have ultra-low expansion characteristics, ultra-surface-smoothness and high rigidity and that is favorable for various constitutive parts of next-generation semiconductor production devices, and relates to a method for producing it.

2. Background Art $SiO_2$—$Al_2O_3$-based or $Li_2O$—$Al_2O_3$—$SiO_2$-based crystallized glass may be made to have, for example, low-expansion characteristics (e.g., see Patent Reference 1, Patent Reference 2); and in addition, it has other useful physical properties intrinsic to crystallized glass of the type, such as high rigidity, and ultra-surface-smoothness after polished.

On the other hand, in a process of producing $SiO_2$—$Al_2O_3$-based or $Li_2O$—$Al_2O_3$—$SiO_2$-based crystallized glass, the melting temperature of the precursor glass for it is generally from 1450° C. to 1600° C. and is high. In the process of producing the crystallized glass of the type, a clarifying agent may be added for the purpose of homogenizing and clarifying the glass melt; and an arsenic component and an antimony component may be used as the clarifying agent having the effect within the above-mentioned high temperature range. However, the arsenic component and the antimony component may have negative influences on human bodies and the environment, and the requirement of not using these components as much as possible is increasing.

Heretofore, however, no one knows compositions of $SiO_2$—$Al_2O_3$-based or $Li_2O$—$Al_2O_3$—$SiO_2$-based crystallized glass that has various physical properties such as low-expansion characteristics intrinsic to crystallized glass and contains a clarifying agent capable of being substituted for an arsenic component and an antimony component and having a high clarifying effect on the same level as that of those components.

Patent Reference 3, Patent Reference 4 and Patent Reference 5 disclose $Li_2O$—$Al_2O_3$—$SiO_2$-based crystallized glass, suggesting some other clarifying agents than an $As_2O_3$ component or an $Sb_2O_3$ component.

Examples in Patent Reference 3 all contain an $As_2O_3$ component or an $Sb_2O_3$ component to the same degree as before, and these do not verify whether the reduction in the content of the clarifying agent or the absence of the clarifying agent could attain the same effect as in this reference.

Examples in Patent Reference 4 all contain an $As_2O_3$ component to the same degree as before, and these do not verify whether the reduction in the content of the clarifying agent or the absence of the clarifying agent could attain the same effect as in this reference.

Examples in Patent Reference 5 do not contain an $As_2O_3$ component or an $Sb_2O_3$ component, and their transmittance within a visible light region is poor and their expansion coefficient is large.

Patent Reference 6 discloses a method for producing $Li_2O$—$Al_2O_3$—$SiO_2$-based crystallized glass to which helium or neon are added in its production step for clarifying the glass. For adding helium or neon, the reference discloses a method of melting the glass material in a helium or neon atmosphere, and a method of melting a substance or cullet glass containing a high concentration of helium or neon as the glass material. In the former method, however, the cost of the production equipment is high and therefore the equipment maintenance cost is also high. In the latter method, the production of the substance or cullet glass containing a high concentration of helium or neon and the supply thereof in a market are not realistic.

Patent Reference 1: JP-A-8-133783
Patent Reference 2: JP-A-2005-89272
Patent Reference 3: JP-A-2002-326837
Patent Reference 4: JP-A-2000-247681
Patent Reference 5: JP-A-60-255634
Patent Reference 6: JP-A-2005-53711

SUMMARY OF THE INVENTION

An object of the invention is to provide $SiO_2$—$Al_2O_3$-based or $Li_2O$—$Al_2O_3$—$SiO_2$-based crystallized glass which has various properties intrinsic to the crystallized glass of the type and which contains an arsenic component or an antimony component in an amount as small as possible or does not contain an arsenic component and an antimony component; and to provide a method for producing the crystallized glass.

We, the present inventors have assiduously studied for the purpose of attaining the above-mentioned object and, as a result, have reached a technique of adding an $SnO_2$ component and/or a $CeO_2$ component, as a clarifying agent, to crystallized glass that contains components of $SiO_2$ and $Al_2O_3$ and a technique of preferably defining the content of these components within a specific range, and have completed the present invention.

Specifically, preferred embodiments of the invention are represented by any of the following constitutions.

(Constitution 1)
Crystallized glass containing components of $SiO_2$ and $Al_2O_3$ (as oxides) and containing an $SnO_2$ component (as oxide) and/or a $CeO_2$ component (as oxide).

(Constitution 2)
Crystallized glass of the constitution 1, which further contains an $Li_2O$ component (as oxide).

(Constitution 3)
Crystallized glass of the constitution 1 or 2, which contains β-quartz (β-$SiO_2$) and/or β-quartz solid solution (β-$SiO_2$ solid solution) as the main crystal phase thereof.

(Constitution 4)
Crystallized glass of any of the constitutions 1 to 3, wherein the mean crystal particle size of the main crystal phase is within a range of from 5 to 200 nm.

(Constitution 5)
Crystallized glass of any of the constitutions 1 to 4, wherein the maximum temperature in thermal treatment for crystallization is from 750 to 850° C.

(Constitution 6)
Crystallized glass of any of the constitutions 1 to 5, of which the average linear thermal expansion coefficient within a temperature range of from 0 to 50° C. is within 0.0±0.5 ($10^{-7°}$ $C.^{-1}$) and (maximum value−minimum value) of ΔL/L is within a range of $10×10^{-7}$.

(Constitution 7)
Crystallized glass of any of the constitutions 1 to 6, wherein the wavelength for 80% light transmittance through the glass having a thickness of 10 mm is at most 680 nm.

(Constitution 8)
Crystallized glass of any of the constitutions 1 to 7, which contains the following components each within the range in terms of percent by mass of the oxide:

SiO₂, from 50 to 62%;
Al₂O₃, from 22 to 26%;
Li₂O, from 0 to 5%.
(Constitution 9)
Crystallized glass of any of the constitutions 1 to 8, which contains the following components each within the range in terms of percent by mass of the oxide:
SnO₂, from 0.01 to 5.0% and/or
CeO₂, from 0.01 to 5.0%.
(Constitution 10)
Crystallized glass of any of the constitutions 1 to 9, which contains the following components in the amount indicated below in terms of percent by mass of the oxide:
MgO, from 0 to 4% and/or
ZnO, from 0 to 4% and/or
CaO, from 0 to 4% and/or
BaO, from 0 to 4% and/or
TiO₂, from 1 to 4% and/or
ZrO₂, from 1 to 4% and/or
P₂O₅, from 5 to 10%.
(Constitution 11)
Crystallized glass of the constitution 10, wherein the ratio of the P₂O₅ component to the SiO₂ component and to the Al₂O₃ component is as follows, in terms of percent by mass of the oxide:
P₂O₅/SiO₂, from 0.1230 to 0.1450;
P₂O₅/Al₂O₃, from 0.270 to 0.330.
(Constitution 12)
Crystallized glass of the constitution 10 or 11, wherein the content of the SiO₂ component, the Al₂O₃ component and the P₂O₅ component is as follows, in terms of percent by mass of the oxide:
SiO₂+Al₂O₃+P₂O₅=from 85.0 to 89.0%.
(Constitution 13)
Crystallized glass of any of the constitutions 1 to 12, which does not substantially contain PbO, Na₂O and K₂O components (as oxides).
(Constitution 14)
Crystallized glass of any of the constitutions 1 to 13, which does not substantially contain an As₂O₃ component (as oxide) and/or an Sb₂O₃ component (as oxide).
(Constitution 15)
Crystallized glass of any of the constitutions 1 to 14, which contains at least one or more components selected from a fluoride component, a sulfate component, a chloride component, an MnO₂ component (as oxide), a WO₃ component (as oxide), a Ta₂O₅ component (as oxide) and an Nb₂O₅ component (as oxide).
(Constitution 16)
A mask for lithography, comprising crystallized glass of any of the constitutions 1 to 15.
(Constitution 17)
An optical reflection mirror for lithography, comprising crystallized glass of any of the constitutions 1 to 15.
(Constitution 18)
A wafer stage or reticule stage for lithography, comprising crystallized glass of any of the constitutions 1 to 15.
(Constitution 19)
A part of precision instruments, comprising crystallized glass of any of the constitutions 1 to 15.
(Constitution 20)
A method for producing crystallized glass comprising melting an amorphous glass material, shaping the melted amorphous glass material and then heat-treating it to obtain crystallized glass; wherein the amorphous glass contains SiO₂ and Al₂O₃ components (as oxides) and wherein an SnO₂ component (as oxide) and/or a CeO₂ component (as oxide) are used as a clarifying agent.
(Constitution 21)
The method for producing crystallized glass of the constitution 20, wherein the amorphous glass further contains an Li₂O component (as oxide).
(Constitution 22)
The method for producing crystallized glass of the constitution 20 or 21, wherein the amorphous glass contains the following components each within the range in terms of percent by mass of the oxide:
SiO₂, from 50 to 62%;
Al₂O₃, from 22 to 26%;
Li₂O, from 0 to 5%.
(Constitution 23)
The method for producing crystallized glass of any of the constitutions 20 to 22, wherein the amorphous glass contains the following components each within the range in terms of percent by mass of the oxide:
SnO₂, from 0.01 to 5.0% and/or
CeO₂, from 0.01 to 5.0%.
(Constitution 24)
The method for producing crystallized glass of any of the constitutions 20 to 23, wherein at least one or more components selected from a fluoride component, a sulfate component, a chloride component, an MnO₂ component (as oxide), a WO₃ component (as oxide), a Ta₂O₅ component (as oxide) and an Nb₂O₅ component (as oxide) are used as the clarifying agent.

In the above-mentioned constitutions, the constitutive components of the composition are expressed in terms of % by mass of the oxide thereof and therefore, though they could not be directly expressed, but for the purpose of attaining the same results as in the above-mentioned constitutions, their content may fall nearly within the range mentioned below in terms of % by mol.
(Constitution 25)
Crystallized glass of any of the constitutions 1 to 7, which contains the following components each within the range in terms of percent by mol of the oxide:
SiO₂, from 57 to 70%;
Al₂O₃, from 13 to 18%;
Li₂O, from 0 to 11%.
(Constitution 26)
Crystallized glass of any of the constitutions 1 to 8, which contains the following components each within the range in terms of percent by mol of the oxide:
SnO₂, from 0.005 to 2.5% and/or
CeO₂, from 0.005 to 2.5%.
(Constitution 27)
Crystallized glass of any of the constitutions 1 to 9, which contains the following components in the amount indicated below in terms of percent by mol of the oxide:
MgO, from 0 to 3.5% and/or
ZnO, from 0 to 2% and/or
CaO, from 0 to 5% and/or
BaO, from 0 to 2% and/or
TiO₂, from 0.5 to 4% and/or
ZrO₂, from 0.4 to 2.5% and/or
P₂O₅, from 2 to 5%.

The invention provides SiO₂—Al₂O₃-based or Li₂O—Al₂O₃—SiO₂-based crystallized glass not containing an arsenic component or an antimony component or containing it in an amount as small as possible but capable of attaining a clarifying effect to the same level as that of an arsenic component or an antimony component. The crystallized glass has various physical properties intrinsic to crystallized glass of the type, and does not contain an arsenic component or an antimony component, or even though it contains the component, the content of the component therein is as small as possible. The invention also provides a method for producing the crystallized glass.

A preferred embodiment of the invention provides $SiO_2$—$Al_2O_3$-based or $Li_2O$—$Al_2O_3$—$SiO_2$-based crystallized glass of which the average linear thermal expansion coefficient within a temperature range of from 0 to 50° C. is within $0.0\pm0.5$ ($10^{-7}$/° C.) and (maximum value−minimum value) of $\Delta L/L$ is within a range of $10\times10^{-7}$; and provides a method for producing the crystallized glass.

Another preferred embodiment of the invention provides crystallized glass which comprises fine crystal particles having a mean crystal particle size of from 5 nm to 200 nm, which has ultra-surface-smoothness having a surface roughness Ra after polishing of at most 3 angstroms, and which is free from ion diffusion of PbO, $Na_2O$ and $K_2O$ components; and provides a method for producing the crystallized glass.

DETAILED DESCRIPTION OF THE INVENTION

Figure 1:
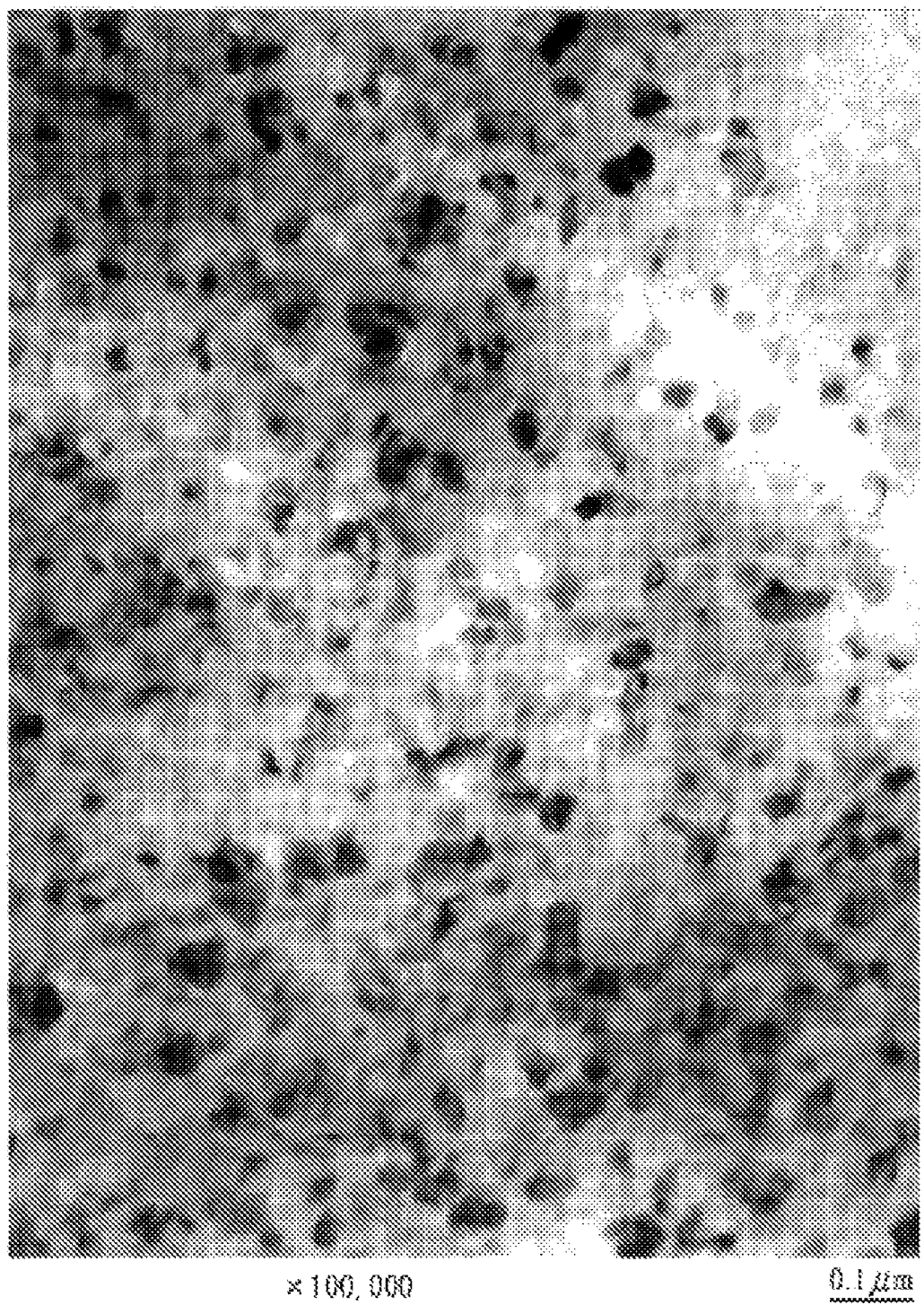
FIG. 1 is a photographic picture of the fine structure in Example 4 taken with a transmission electronic microscope.

One characteristic feature of the $SiO_2$—$Al_2O_3$-based or $Li_2O$—$Al_2O_3$—$SiO_2$-based crystallized glass is its low expansion property. The $SiO_2$—$Al_2O_3$-based or $Li_2O$—$Al_2O_3$—$SiO_2$-based crystallized glass may satisfy its low expansion property when it has a specifically-defined composition of itself. The constitutive members used in the next-generation lithography technology in semiconductor production by the use of EUV light are required to have thermal dimensional stability, strength, thermal durability and chemical stability; and in particular, they are required to have ultra-low expansion characteristics that are necessary for the thermal expansion stability. Taking advantage of the low expansion property thereof, use of $SiO_2$—$Al_2O_3$-based or $Li_2O$—$Al_2O_3$—$SiO_2$-based crystallized glass in the above-mentioned constitutive members is investigated.

In its preferred embodiment, the $SiO_2$—$Al_2O_3$-based or $Li_2O$—$Al_2O_3$—$SiO_2$-based crystallized glass may have a smooth surface, after polished, that is applicable to the next-generation lithography, and this is another characteristic feature of the crystallized glass.

Preferred embodiments of the crystallized glass of the invention are described below. Not specifically indicated, the constitutive components are expressed as the oxide thereof, and the content of each component is expressed in terms of percent by mass of the oxide.

The expression "as oxide" as referred to in this description means a method of expressing the constitutive component in the crystallized glass of the invention, which is as follows: Of the constitutive components of the crystallized glass of the invention, the composite salts and others except the fluoride component, the sulfate component and the chloride component are presumed to be all decomposed into their oxides during the step of melting the glass material, and each constitutive component of the crystallized glass is expressed as the oxide thereof. Regarding its content, each constitutive component of the crystallized glass is expressed in terms of percent by mass of the oxide, relative to the overall weight of the expressed oxides, 100% by mass, in the glass.

$SiO_2$—$Al_2O_3$-based crystallized glass that contains an $SiO_2$ component and an $Al_2O_3$ component, and $Li_2O$—$Al_2O_3$—$SiO_2$-based crystallized glass that further contains an $Li_2O$ component are processed to contain components of $SnO_2$ and/or $CeO_2$, while they are kept having the above-mentioned characteristics, and the crystallized glass may have a high clarifying effect to the same level as those containing an $As_2O_3$ component or an $Sb_2O_3$ component.

For keeping the above-mentioned characteristics and for having the high clarifying effect, any of an $SnO_2$ component or a $CeO_2$ component is preferably added to the crystallized glass. The lowermost limit of the $SnO_2$ component or the $CeO_2$ component is preferably 0.05% by mass each, more preferably 0.08%, most preferably 0.1%. Similarly for keeping the above-mentioned characteristics and for having the high clarifying effect, the uppermost limit of the $SnO_2$ component or the $CeO_2$ component is preferably 5.0% by mass each, more preferably 2.0%, most preferably 1.5%.

For keeping the above-mentioned characteristics and for having the clarifying effect to a higher degree, both of an $SnO_2$ component and a $CeO_2$ component are preferably added to the crystallized glass. In this case, the content of each of the $SnO_2$ component or the $CeO_2$ component is most preferably within the above-mentioned range.

"Crystallized glass" as referred to in this description means a material obtained through heat treatment of glass for crystal precipitation in the glass phase, and this material comprises amorphous solid and crystal.

"Mean crystal particle size" as referred to in this description means a mean value of the crystal particle size determined through visual measurement on a photographic picture taken with a transmission electronic microscopic. The number of particles to be visually analyzed is at least 30. The crystal particle size is measured in a predetermined direction of a particle in the field of view, and this is the distance between the two parallel lines that sandwich the crystal particle.

"Maximum value−minimum value of $\Delta L/L$" as referred to in this description is meant to indicate the difference between the maximum value and the minimum value of $\Delta L/L$ wherein L means the length of the crystallized glass at 0° C. and $\Delta L$ means a length change of the crystallized glass at any other temperature, within the temperature range.

The ultra-low expansion characteristic as referred to in this description means that, within the temperature range of 0° C. to 50° C., the average linear thermal expansion coefficient ($\alpha$) is within a range of $0.0\pm0.5$ ($10^{-7}$° $C.^{-1}$) and the (maximum value−minimum value) of $\Delta L/L$ is within a range of $10\times10^{-7}$; preferably the average linear thermal expansion coefficient is within a range of $0.0\pm0.2$ ($10^{-7}$° $C.^{-1}$) and the (maximum value−minimum value) of $\Delta L/L$ is within a range of $10\times10^{-7}$; more preferably the average linear thermal expansion coefficient is within a range of $0.0\pm0.1$ ($10^{-7}$° $C.^{-1}$) and the (maximum value−minimum value) of $\Delta L/L$ is within a range of $8\times10^{-7}$.

The main crystal phase as referred to in this description is meant to indicate all the crystal phases having a relatively large precipitation ratio. In other words, in an X-ray chart of X-ray diffractometry (the vertical axis indicates the X-ray diffraction strength, and the horizontal axis indicates the diffraction angle), when the ratio of the X-ray diffraction strength at the main peak of a precipitation phase (the highest peak of the crystal phase) to the X-ray diffraction strength at the main peak (the highest peak) of the crystal phase having a largest precipitation proportion, set as 100, is at least 30 (the ratio is hereinafter referred to as X-ray strength ratio), then all the crystal phases satisfying this are the main crystal phases. Preferably, the X-ray strength ratio of the crystal phases except the main crystal phase is less than 20, more preferably less than 10, most preferably less than 5.

Regarding the average linear thermal expansion coefficient, the materials in the field of various semiconductor production devices and ultra-precision members are required to have thermal expansion characteristics enough for those precision instruments. To satisfy the requirements, it is desirable that the average linear thermal expansion coefficient, $\alpha$, within a temperature range of from 0 to 50° C. is at most $0.0\pm0.5$ ($10^{-7\circ}$ C.$^{-1}$), more preferably at most $0.0\pm0.4$ ($10^{-7\circ}$ C.$^{-1}$). In a preferred embodiment of the crystallized glass of the invention, the average linear thermal expansion coefficient and (maximum value–minimum value) of $\Delta L/L$ each fall within the above-mentioned range. The composition of the constitutive components of the crystallized glass that has relation to the physical properties is controlled to fall within the range mentioned hereinunder, whereby the glass may readily have the physical property value, $\alpha$, of at most $0.0\pm0.5$ ($10^{-7\circ}$ C.$^{-1}$); and when the composition is controlled more, then the glass may be more readily have the physical property value, $\alpha$, of at most $0.0\pm0.1$ ($10^{-7\circ}$ C.$^{-1}$).

Unless otherwise specifically indicated in this description, the average linear thermal expansion coefficient is expressed as a unit of ($10^{-7\circ}$ C.$^{-1}$).

Also similarly, in order that a glass material may have thermal expansion characteristics enough for precision instruments, it is desirable that the (maximum value–minimum value) of $\Delta L/L$ within a temperature range of from 0 to 50° C. is within a range of at most $10\times10^{-7}$. In a preferred embodiment of the crystallized glass of the invention, the (maximum value–minimum value) of $\Delta L/L$ falls within the above-mentioned range. More preferably, the (maximum value–minimum value) of $\Delta L/L$ is within a range of at most $9\times10^{-7}$. By controlling the condition for thermal treatment for crystallization thereof, the crystallized glass of the invention may readily satisfy the physical requirement, (maximum value–minimum value) of $\Delta L/L$ falling within a range of at most $10\times10^{-7}$. By more strictly controlling the condition for thermal treatment for crystallization thereof, the crystallized glass may readily satisfy the physical requirement, (maximum value–minimum value) of $\Delta L/L$ falling within a range of at most $9\times10^{-7}$, more preferably within a range of at most $8\times10^{-7}$.

The surface roughness after polishing and the precipitated crystal size are described. In the field of various semiconductor production devices and ultra-precision members, the smoothness of the substrate surface enough for those precision instruments is important. For attaining the surface smoothness, the relation between the mean crystal particle size and the surface roughness should be specifically noted. When the application of the crystallized glass of the invention to the field of various semiconductor production devices and ultra-precision members is taken into consideration, the surface roughness, Ra, after polishing of the glass is preferably at most 3 angstroms, more preferably at most 2 angstroms. For easily attaining the surface smoothness, it is desirable that the mean crystal particle diameter of the precipitated crystals of the material is at most 200 nm, more preferably at most 90 nm, most preferably at most 80 nm. On the other hand, in order to make the mechanical strength of the crystallized glass fall within a desired range, the mean crystal particle diameter is preferably at least 5 nm, more preferably at least 50 nm, most preferably at least 60 nm. When the composition of the constitutive components of the crystallized glass that has relation to the precipitated crystal size is controlled to fall within a range mentioned below and when the crystallization condition is suitably controlled, then the crystallized glass may readily have the surface roughness value Ra after polishing and the mean crystal particle size each falling within the range as above.

The crystallized glass of the invention may have the intended low-expansion characteristics through precipitation of the main crystal phase having a negative average linear thermal expansion coefficient thereby making the positive expansion coefficient of the glass phase offset the negative expansion coefficient of the crystal phase. In order that the crystallized glass may have ultra-low expansion characteristics, it is desirable that the main crystal phase of the glass contains $\beta$-quartz ($\beta$-$SiO_2$) and/or $\beta$-quartz solid solution ($\beta$-$SiO_2$ solid solution). When the composition of the constitutive components of the crystallized glass that has relation to the precipitated crystal phase is controlled to fall within the range mentioned below and when the crystallization condition is suitably controlled, then the crystallized glass may more readily have the intended ultra-low expansion characteristics. The $\beta$-quartz solid solution as referred to in this description is meant to indicate an interstitial one with any other elements than Si and O and intercalated into $\beta$-quartz and/or a substitutional one with such elements substituted therein. Especially preferred is a crystalline body having $Al^{+3}$ as substituted for $Si^{+4}$ and having $Li^+$, $Mg^{+2}$ and $Zn^{+2}$ added thereto for the equivalence thereof. (One typical example is $\beta$-eucryptite.)

The $SiO_2$ component is a component having relation to the precipitation of the $\beta$-quartz and $\beta$-quartz solid solution as the main crystal phase through thermal treatment of a glass material; and when its amount is at least 50%, then the precipitated crystal of the obtained, crystallized glass may be stable and its structure is hardly coarsened with the result that the mechanical strength of the glass is increased and the surface roughness thereof, after polished, may be reduced. When the amount is at most 62%, then the glass material may be readily melted and shaped and the shaped article may have improved homogeneousness. For more readily attaining the above-mentioned effect, the lowermost limit of the component amount is more preferably 53%, most preferably 53.5%. The uppermost limit of the component amount is more preferably 57%, most preferably 56.8%.

The $P_2O_5$ component has an effect of improving the meltability and the clearness of the glass material, and an effect of stabilizing the thermal expansion after the thermal treatment for crystallization to be a desired value. When this is combined with the $SiO_2$ component, its effects may be enhanced more. In the crystallized glass of the invention, when the amount of the $P_2O_5$ component is at least 5%, then the above-mentioned effects may be greatly enhanced; and when it is at most 10%, then the devitrification resistance of the glass material is bettered and the structure of the glass ceramics is prevented from being coarsened during the crystallization stage owing to the reduction in the devitrification resistance, therefore resulting in the increase in the mechanical strength of the crystallized glass. For more readily attaining the above-mentioned effects, the lowermost limit of the component amount is more preferably 7.3%, most preferably 7.4%. Similarly, for more readily attaining the effects, the uppermost limit of the component amount is more preferably 8.7%, most preferably 8.5%.

When the amount of the $Al_2O_3$ component is at least 22%, then the glass material may be readily melted, and therefore the homogeneousness of the obtained, crystallized glass may be bettered and further the chemical durability of the crystallized glass is also bettered. When the amount is at most 26%, then the devitrification resistance of the glass material is bettered and the structure of the crystallized glass is prevented from being coarsened during the crystallization stage owing to the reduction in the devitrification resistance, therefore resulting in the increase in the mechanical strength of the crystallized glass.

For more readily attaining the above-mentioned effects, the lowermost limit of the component amount is more preferably 22.5%, most preferably 23%. Similarly, for more readily attaining the effects, the uppermost limit of the component amount is more preferably 25.7%, most preferably 25.3%.

Further, in case where the crystallized glass satisfies any one or two or more of the conditions that $SiO_2+Al_2O_3+P_2O_5$=from 85.0 to 89.0%, that the ratio of the $P_2O_5$ component to the $SiO_2$ component in terms of percent by mass, $P_2O_5/SiO_2$=from 0.1230 to 0.1450, and that the ratio of the $P_2O_5$ component to the $Al_2O_3$ component in terms of percent by mass, $P_2O_5/Al_2O_3$=from 0.270 to 0.330 are satisfied, then its low-expansion property may be readily improved significantly and the glass may readily have ultra-low expansion characteristics within a temperature range of from 0° C. to 50° C.

For more readily attaining the above-mentioned effects, the lowermost limit of the content of $SiO_2+Al_2O_3+P_2O_5$ is more preferably 85.5%, most preferably 85.8%. Similarly, for more readily attaining the effects, the uppermost limit of the content of $SiO_2+Al_2O_3+P_2O_5$ is more preferably 88.7%, most preferably 88.4%.

For more readily attaining the above-mentioned effects, the lowermost limit of $P_2O_5/SiO_2$ is more preferably 0.1310, most preferably 0.1320. Similarly for more readily attaining the effects, the uppermost limit of $P_2O_5/SiO_2$ is more preferably 0.1430, most preferably 0.1426.

For more readily attaining the above-mentioned effects, the lowermost limit of $P_2O_5/Al_2O_3$ is more preferably 0.290, most preferably 0.300. Similarly for more readily attaining the effects, the uppermost limit of $P_2O_5/Al_2O_3$ is more preferably 0.320.

The three components, $Li_2O$, MgO and ZnO are components that may be readily the constitutive elements of β-quartz solid solution. When combined with the $SiO_2$ component and the $P_2O_5$ component each falling within the above-mentioned composition range, these three components are effective for improving the low-expansion property of the crystallized glass and for reducing the deformation thereof at high temperature, and in addition, they are effective for significantly improving the meltability and the clearness of the glass material. These three components may be optionally in the crystallized glass in case where the crystallized glass may readily enjoy their effects mentioned above.

When the amount of the $Li_2O$ component is at least 3%, the above-mentioned effects may be greatly improved and, in addition, the meltability of the glass material may also be improved thereby resulting in that the homogeneousness of the crystallized glass may be improved. Further, the component is favorable since the precipitation of β-quartz and β-quartz solid solution is greatly improved. When the amount of the component is at most 5%, then the low-expansion property of the crystallized glass may be greatly improved, and the glass may readily have ultra-low-expansion characteristics. Further, the devitrification resistance of the glass material may be bettered and the structure of the precipitated crystal in the crystallized glass after the crystallization stage may be prevented from being coarsened owing to the reduction in the devitrification resistance, therefore resulting in the increase in the mechanical strength of the crystallized glass. For more readily attaining the above-mentioned effects, the lowermost limit of the component amount is most preferably 3.5%. For more readily attaining the effects, the uppermost limit of the component amount is more preferably 4.5%, most preferably 4.3%.

The MgO component is an optional component that may be in the crystallized glass for attaining the above-mentioned effects. When the component is added to the glass and when its amount is at least 0.3%, then it is favorable since the effects may be greatly improved; and when its amount is at most 4%, then the low-expansion property of the crystallized glass may be greatly improved and the glass may have ultra-low-expansion characteristics. For more readily attaining the effects, the lowermost limit of the component amount is most preferably 0.5%. Similarly for more readily attaining the effects, the uppermost limit of the component amount is more preferably 2%, most preferably 1.5%.

The ZnO component is an optional component that may be in the crystallized glass for attaining the above-mentioned effects. When the component is added to the glass and when its amount is at least 0.1%, then it is favorable since the effects may be greatly improved; and when its amount is at most 4%, then the low-expansion property of the crystallized glass may be greatly improved and the glass may have ultra-low-expansion characteristics. Further, the devitrification resistance of the glass material may be bettered and the structure of the precipitated crystal in the glass ceramics after the crystallization stage may be prevented from being coarsened owing to the reduction in the devitrification resistance, therefore resulting in the increase in the mechanical strength of the crystallized glass. For more readily attaining the above-mentioned effects, the lowermost limit of the component amount is most preferably 0.2%. Similarly for more readily attaining the effects, the uppermost limit of the component amount is more preferably 2%, most preferably 1.2%.

The two components, CaO and BaO basically remain in the glass matrix except the crystals precipitated in the crystallized glass, thereby having some influences on the effect of improving the ultra-low-expansion characteristics and the meltability of the glass; and these are optional components that may be in the glass for delicate control of the relative amount of the crystal phase and the glass matrix phase.

For attaining the above-mentioned effects, the CaO component is an optional component in the glass. When its amount is at least 0.3%, then the melt-clarifying effect of the component is remarkable; and when its amount is at most 4%, then the low-expansion property of the glass may be greatly improved and the glass may readily have ultra-low expansion characteristics. In addition, the devitrification resistance of the glass material may be bettered more and the structure of the precipitated crystal in the crystallized glass after the crystallization stage may be prevented from being coarsened owing to the reduction in the devitrification resistance, therefore resulting in the increase in the mechanical strength of the glass. For more readily attaining the above-mentioned effects, the lowermost limit of the component amount is most preferably 0.5%. Similarly for more readily attaining the effects, the uppermost limit of the component amount is more preferably 2%, most preferably 1.5%.

The BaO component is an optional component in the crystallized glass for attaining the above-mentioned effects. When its amount is from 0.3% to 4%, then the low-expansion property of the glass may be greatly improved and the glass may readily have ultra-low expansion characteristics. In addition, the devitrification resistance of the glass material may be bettered more and the structure of the precipitated crystal in the crystallized glass after the crystallization stage may be prevented from being coarsened owing to the reduction in the devitrification resistance, therefore resulting in the increase in the mechanical strength of the glass. For more readily attaining the above-mentioned effects, the lowermost limit of the component amount is most preferably 0.5%. Similarly for more readily attaining the effects, the uppermost limit of the component amount is more preferably 2%, most preferably 1.5%.

The $TiO_2$ component and the $ZrO_2$ component are both components useful as a crystal-nucleating agent. When the amount of these components is at least 1%, then the intended crystal phase may be precipitated. When the amount is at most 4%, then an unmelted matter does not form and the meltability of the glass material is bettered and the homogeneousness of the crystallized glass is thereby improved. For more readily attaining the above-mentioned effects, the lowermost limit of the $TiO_2$ component is more preferably 1.7%, most preferably 1.9%. The lowermost limit of the $ZrO_2$ component is more preferably 1.3%, most preferably 1.6%. Similarly for more readily attaining the effects, the uppermost limit of the $TiO_2$ component is more preferably 2.9%, most preferably 2.8%. The uppermost limit of the $ZrO_2$ component is more preferably 2.7%, most preferably 2.4%.

The $As_2O_3$ component and the $Sb_2O_3$ component may be harmful to the environment, and their use must be minimized as much as possible. Since the crystallized glass of the invention may have a clarifying effect even though it does not contain such $As_2O_3$ and $Sb_2O_3$ components, and therefore it is desirable that the glass does not contain these $As_2O_3$ and $Sb_2O_3$ components for reducing the negative influence on the environment.

In addition to the above-mentioned component, the crystallized glass of the invention may further contain one and/or at least two of other components SrO, $B_2O_3$, $La_2O_3$, $Bi_2O_3$, $Y_2O_3$, $Gd_2O_3$, $SnO_2$, $CeO_2$, in an amount of at most 2% as the total amount thereof, for delicate control of the properties of the glass but not interfering with the characteristics thereof; and further in addition, the glass may contain one or more of coloring components such as CoO, NiO, $Fe_2O_3$ and $Cr_2O_3$, in an amount of at most 2% as the total amount thereof.

The fluoride component, the sulfate component and the chloride component are also expected to have the clarification effect, and these are optional components in the glass. For example, the fluoride component may be added to the glass as $MgF_2$ or $CaF_2$; the sulfate component may be as $BaSO_4$; and the chloride component may be as $BaCl_2$, etc.

In order that the glass may attain the clarification effect of those components, it is desirable that the lowermost limit of the total amount of the fluoride component as $F_2$, the sulfate component as $SO_3$ and the chloride component as $Cl_2$ is 0.05 parts by weight relative to 100 parts by weight of the amount of the others, as the oxides thereof, than those components, most preferably 0.15 parts by weight. Similarly, the uppermost limit of the total amount of those components may well be 5 parts by weight, more preferably 2 parts by weight, most preferably 1.5 parts by weight.

For attaining the clarification effect of those components, the lowermost limit of the amount of each component in the glass is more preferably 0.05 parts by weight, most preferably 0.15 parts by weight. Also similarly, for attaining the effect thereof, the uppermost limit of the amount of each component is preferably 3 parts by weight, more preferably 2 parts by weight, most preferably 1.5 parts by weight.

The $MnO_2$ component, the $WO_3$ component, the $Ta_2O_5$ component and the $Nb_2O_5$ component may also be expected to have the clarification effect; and in place of or along with the fluoride component, the sulfate component and the chloride component, the above components may be optionally in the glass of the invention.

For attaining the clarification effect, the lowermost limit of the total content of the $MnO_2$ component, the $WO_3$ component, the $Ta_2O_5$ component and the $Nb_2O_5$ component is more preferably 0.05%, most preferably 0.2%. Similarly, the uppermost limit of the total content of these components may well be 5%, more preferably 3%, most preferably 1.5%.

For attaining the clarification effect, the lowermost limit of the content of each component of these is more preferably 0.05%, most preferably 0.2%. Similarly for attaining the effect, the uppermost limit of the content of each component of these is preferably 5%, more preferably 2%, most preferably 1.5%.

In case where the crystallized glass of the invention is to have ultra-low expansion characteristics, a main crystal phase having a negative average linear thermal expansion coefficient is precipitated in the glass and, as combined with the glass matrix phase having a positive average linear thermal expansion coefficient therein, it realizes the intended ultra-low expansion characteristics as a whole. For this, it is desirable that the glass does not contain a crystal phase having a positive average linear thermal expansion coefficient, or that is, lithium disilicate, lithium silicate, α-quartz, α-cristobalite, α-tridymite, Zn-petalite, as well as petalite, wollastonite, forsterite, diopsite, nepheline, clinoenstatite, anorthite, celsian, gehlenite, feldspar, willemite, mullite, corundum, rankinite, larnite and their solid solutions. In addition to these, it is also desirable that the glass does not contain tungstates such as Hf tungstate and Zr tungstate, titanates such as magnesium titanate, barium titanate and manganese titanate, and mullite, 2-barium 3-silicate, $Al_2O_3 \cdot 5SiO_2$ and their solid solutions, for keeping its good mechanical strength.

In case where various films are formed on the crystallized glass of the invention for producing optical filters or photomasks for use in semiconductor production, it is desirable that the glass does not contain components of PbO, $Na_2O$ and $K_2O$ that are problematic in the process of film formation in order to prevent ion diffusion of those components.

The crystallized glass of the invention may have a high clarification effect even though not melted in an atmosphere of helium, neon or the like. Accordingly, though the crystallized glass of the invention does not interfere with addition of helium or neon thereto, it does not contain helium or neon as the constitutive ingredient thereof so far as they are not intentionally added to the glass.

The heat conductivity and the Young's modulus of the crystallized glass of the invention are preferably as follows, in application to lithography in next-generation semiconductor production devices. The heat conductivity is preferably within a range of from 1.0 to 2.0 W/(m·K), more preferably its lowermost limit is 1.5 W/(m·K) and/or its uppermost limit is 1.9 W/(m·K), since the glass must rapidly cool the material that has become heated in a process of film formation or electronic ray irradiation.

In case where the glass is used as precision members, its Young's modulus is an important parameter for preventing microcracks in weight reduction processing, ultra-precision polishing, and microprocessing, and also for reducing negative influences thereon of external factors such as various types of vibrations. The Young's modulus is preferably within a range of from 85 to 95 GPa, more preferably its lowermost limit is 90 GPa and/or its uppermost limit is 94 GPa.

The crystallized glass of the invention may be produced, for example, according to the method mentioned below. First, materials of glass are weighed, formulated, put into a crucible or the like, and melted at about 1450° C. to 1600° C., thereby preparing starting glass.

The starting glass is melted in the manner as above, and then cast into a mold and/or hot-shaped into a desired form, and then left cooled.

Next, it is heat-treated so as to convert it into crystallized glass. First, it is kept at a temperature of from 650° C. to 750° C., preferably at a temperature of a lowermost limit of 680° C. and/or an uppermost limit of 720° C., for promoting its nucleation. After the nucleation, it is crystallized at a temperature of from 750° C. to 850° C. When the temperature is lower than 750° C., then it is unfavorable since the main crystal phase could not fully grow; and when it is higher than 850° C., then it is also unfavorable since the starting glass may readily soften and deform or may re-melt. Preferably, therefore, the glass is crystallized at a temperature not lower than the lowermost limit thereof, 770° C. and/or not higher than the uppermost limit thereof, 790° C.

The above-mentioned mask, optical reflection mirror, wafer stage, reticular stage and precision members may be obtained by working the glass ceramics into desired forms and optionally by further working them for lapping, polishing and film formation thereon.

Preferred examples of the invention are described below. First, starting materials of oxide, carbonate, chloride, sulfide and nitrate were mixed, these were melted in an ordinary melting device at a temperature of from about 1450 to 1600° C. with stirring for homogenization, and thereafter shaped and cooled to obtain shaped glass bodies. Next, these were heat-treated at 650 to 750° C. for about 1 to 150 hours for crystal nucleation, and then further heat-treated for crystallization at 750 to 850° C. for about 1 to 300 hours, thereby obtaining crystallized glass.

Table 1 to Table 4 show the glass compositions of Examples 1 to 11 and Comparative Examples 1 to 3, as well as the number of bubbles remaining in the melted amorphous glass, per $cm^3$ of the glass, the maximum temperature in heat treatment for crystallization, the mean crystal particle size, the wavelength for light transmission through the glass having a thickness of 10 mm (this is the value for 5% and 80% light transmission), the average linear expansion thermal coefficient ($\alpha$) at 0° C. to 50° C., and the main crystal phase.

Figure 2:
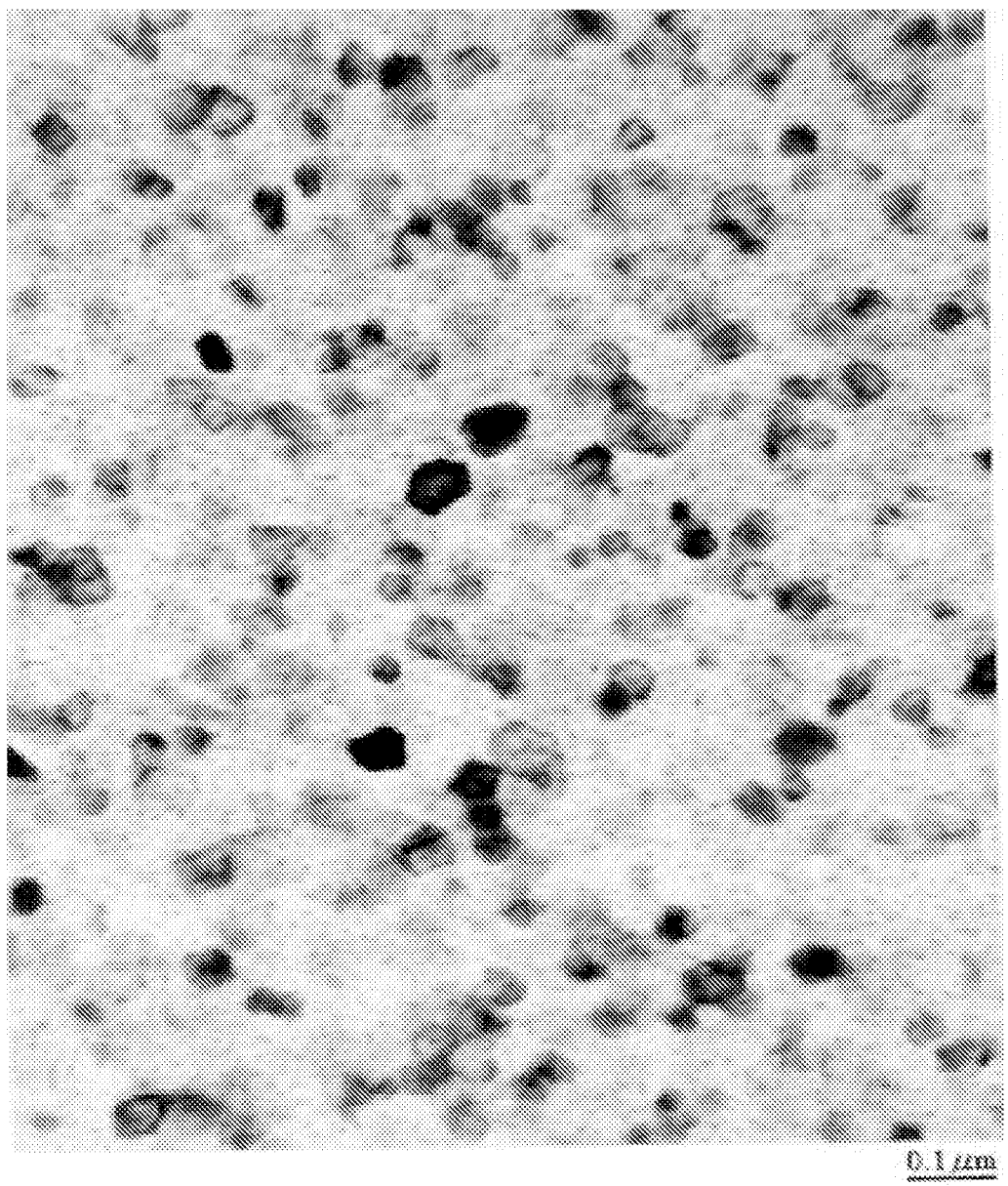
FIG. 2 is a photographic picture of the fine structure in Comparative Example 1 taken with a transmission electronic microscope.

In Examples and Comparative Examples, the composition is in terms of % by mass. FIG. 1 is a photographic picture of the fine structure in Example 4 taken with a transmission electronic microscope (TEM); and FIG. 2 is a photographic picture thereof in Comparative Example 1. Briefly, the sample was sliced into thin sections with an ion-milling device (Gatan's PIPS), and the section was observed with Hitachi's transmission electronic microscope, H800. The invention should not be limited to only the following Examples.

TABLE 1

| | Sample | Example 1 | Example 2 | Example 3 | Example 4 | Example 5 |
|---|---|---|---|---|---|---|
| Composition (mass %) | $SiO_2$ | 55.25 | 55.5 | 56.5 | 56.0 | 54.75 |
| | $Al_2O_3$ | 24.5 | 24.5 | 23.5 | 23.5 | 24.7 |
| | $P_2O_5$ | 7.5 | 7.5 | 7.5 | 7.5 | 7.8 |
| | $Li_2O$ | 4.0 | 4.0 | 4.0 | 4.0 | 4.0 |
| | MgO | 1.0 | 1.0 | 1.0 | 1.0 | 1.0 |
| | CaO | 1.0 | 1.0 | 1.0 | 1.0 | 1.0 |
| | BaO | 1.0 | 1.0 | 1.0 | 1.0 | 1.0 |
| | ZnO | 0.5 | 0.5 | 0.5 | 0.5 | 0.5 |
| | $ZrO_2$ | 2.0 | 2.0 | 2.0 | 2.0 | 2.0 |
| | $TiO_2$ | 2.5 | 2.5 | 2.5 | 2.5 | 2.5 |
| | $CeO_2$ | 0.5 | | 0.5 | 0.5 | 0.25 |
| | $SnO_2$ | | 0.5 | | 0.5 | 0.5 |
| | $Sb_2O_3$ | 0.25 | | | | |
| | total | 100.0 | 100.0 | 100.0 | 100.0 | 100.0 |
| Number of Remaining Bubbles (/$cm^3$) | | 15 | 9 | 11 | 2 | 5 |
| Amorphous Glass | nd | 1.52889 | 1.52834 | 1.52840 | 1.52958 | 1.5289 |
| | vd | 57.4 | 57.2 | 57.3 | 57.5 | 57.5 |
| | wavelength (nm) for 80% transmittance | 360 | 338 | 356 | 363 | 351 |
| | wavelength (nm) for 5% transmittance | 465 | 400 | 452 | 470 | 446 |
| Crystallized Glass | nd | 1.54627 | 1.54580 | 1.54582 | 1.54702 | 1.54641 |
| | vd | 55.5 | 55.5 | 55.6 | 55.4 | 55.6 |
| | wavelength (nm) for 80% transmittance | 437 | 398 | 429 | 440 | 422 |
| | wavelength (nm) for 5% transmittance | 639 | 580 | 579 | 642 | 622 |
| | $\alpha$ (0-50° C.) ($10^{-7}$ °$C.^{-1}$) | −0.30 | −0.38 | −0.22 | −0.23 | −0.32 |
| Main Crystal Phase | | β-quartz solid solution | β-quartz solid solution | β-quartz solid solution | β-quartz solid solution | β-quartz solid solution |
| Maximum Temperature in heat-treatment for crystallization (° C.) | | 780 | 780 | 780 | 780 | 780 |
| Mean Crystal Particle Size (nm) | | 60 | 60 | 60 | 50 | 50 |

TABLE 2

| | Sample | Example 6 | Example 7 | Example 8 | Example 9 |
|---|---|---|---|---|---|
| Composition | $SiO_2$ | 54.6 | 54.0 | 55.2 | 55.0 |
| | $Al_2O_3$ | 24.5 | 24.5 | 25.0 | 24.5 |
| | $P_2O_5$ | 7.5 | 7.5 | 7.8 | 7.8 |
| | $Li_2O$ | 4.0 | 4.0 | 4.0 | 4.0 |
| | MgO | 1.2 | 1.0 | 0.8 | 0.8 |
| | CaO | 1.0 | 1.0 | 1.0 | 1.0 |
| | BaO | 0.8 | 1.0 | 1.0 | 1.0 |
| | ZnO | 0.4 | 0.5 | 0.5 | 0.4 |
| | $ZrO_2$ | 2.0 | 2.0 | 2.0 | 2.0 |
| | $TiO_2$ | 2.5 | 2.5 | 2.5 | 2.5 |
| | $CeO_2$ | 1.0 | 1.0 | 0.1 | |
| | $SnO_2$ | 0.5 | 1.0 | 0.1 | 0.5 |
| | $WO_3$ | | | | 0.5 |
| | total | 100.0 | 100.0 | 100.0 | 100.0 |
| Number of Remaining Bubbles (/cm$^3$) | | 8 | 10 | 10 | 18 |
| Amorphous Glass | nd | 1.53086 | 1.53174 | 1.53040 | 1.52888 |
| | νd | 57.2 | 57.0 | 57.1 | 57.6 |
| | wavelength (nm) for 80% transmittance | 379 | 401 | 338 | 339 |
| | wavelength (nm) for 5% transmittance | 488 | 538 | 414 | 404 |
| Crystallized Glass | nd | 1.54780 | 1.54888 | 1.54420 | 1.54690 |
| | νd | 55.2 | 55.1 | 55.6 | 55.2 |
| | wavelength (nm) for 80% transmittance | 437 | 438 | 389 | 411 |
| | wavelength (nm) for 5% transmittance | 666 | 657 | 593 | 1162 |
| | α (0-50° C.) (10$^{-7}$ °C.$^{-1}$) | −0.02 | 0.00 | −0.11 | −0.32 |
| Main Crystal Phase | | β-quartz solid solution | β-quartz solid solution | β-quartz solid solution | β-quartz solid solution |
| Maximum Temperature in heat-treatment for crystallization (° C.) | | 780 | 780 | 780 | 780 |
| Mean Crystal Particle Size (nm) | | 70 | 60 | 60 | 70 |

TABLE 3

| | Sample | Example 10 | Example 11 |
|---|---|---|---|
| Composition | $SiO_2$ | 55.95 | 56.6 |
| | $Al_2O_3$ | 24.0 | 24.0 |
| | $P_2O_5$ | 7.5 | 7.5 |
| | $Li_2O$ | 4.0 | 4.0 |
| | MgO | 1.0 | 0.8 |
| | CaO | 1.2 | 1.0 |
| | BaO | 1.2 | 1.0 |
| | ZnO | 0.6 | 0.5 |
| | $ZrO_2$ | 2.0 | 2.0 |
| | $TiO_2$ | 2.5 | 2.5 |
| | $CeO_2$ | | 0.05 |
| | $SnO_2$ | 0.05 | 0.05 |
| | total | 100 | 100 |
| | Sulfate (as $SO_3$, wt. pt) | | 0.19 |
| | Chloride (as $Cl_2$, wt. pt) | | 0.17 |
| | Fluoride (as $F_2$, wt. pt) | 0.3 | |
| Number of Remaining Bubbles (/cm$^3$) | | 24 | 20 |
| Amorphous Glass | nd | 1.52646 | 1.52634 |
| | νd | 59.4 | 58.0 |
| | wavelength (nm) for 80% transmittance | 343 | 327 |
| | wavelength (nm) for 5% transmittance | 399 | 369 |
| Crystallized Glass | nd | 1.54305 | 1.54475 |
| | νd | 55.3 | 55.8 |
| | wavelength (nm) for 80% transmittance | 383 | 381 |
| | wavelength (nm) for 5% transmittance | 455 | 454 |
| | α (0-50° C.) (10$^{-7}$ °C.$^{-1}$) | −0.48 | −0.15 |
| Main Crystal Phase | | β-quartz solid solution | β-quartz solid solution |
| Maximum Temperature in heat-treatment for crystallization (° C.) | | 780 | 780 |
| Mean Crystal Particle Size (nm) | | 70 | 70 |

TABLE 4

|  |  | Comparative Example | | |
|---|---|---|---|---|
| Sample | | 1 | 2 | 3 |
| Composition | SiO$_2$ | 55.0 | 57.0 | 55.7 |
|  | Al$_2$O$_3$ | 24.0 | 22.0 | 24.0 |
|  | P$_2$O$_5$ | 8.0 | 8.0 | 8.0 |
|  | Li$_2$O | 4.0 | 4.0 | 4.0 |
|  | MgO | 1.0 | 1.0 | 0.8 |
|  | CaO | 1.0 | 1.0 | 1.2 |
|  | BaO | 1.0 | 1.0 | 1.2 |
|  | ZnO | 0.5 | 0.5 | 0.6 |
|  | ZrO$_2$ | 2.0 | 2.0 | 2.0 |
|  | TiO$_2$ | 2.5 | 2.5 | 2.5 |
|  | As$_2$O$_3$ | 1.0 |  |  |
|  | Sb$_2$O$_3$ |  | 1.0 |  |
|  | total | 100.0 | 100.0 | 100.0 |
| Number of Remaining Bubbles (/cm$^3$) | | 0 | 16 | 80 |
| Amorphous Glass | nd | 1.52786 | 1.53036 | 1.52726 |
|  | νd | 57.6 | 56.8 | 57.3 |
|  | wavelength (nm) for 80% transmittance | 334 | 341 | 328 |
|  | wavelength (nm) for 5% transmittance | 386 | 394 | 374 |
| Crystallized Glass | nd | 1.54608 | 1.54799 | 1.54494 |
|  | νd | 55.3 | 54.7 | 55.7 |
|  | wavelength (nm) for 80% transmittance | 380 | 401 | 379 |
|  | wavelength (nm) for 5% transmittance | 452 | 578 | 447 |
|  | α (0-50° C.) (10$^{-7}$ C.$^{-1}$) | 0.66 | −0.45 | −0.60 |
| Main Crystal Phase | | β-quartz solid solution | β-quartz solid solution | β-quartz solid solution |
| Maximum Temperature in heat-treatment for crystallization (° C.) | | 780 | 795 | 780 |
| Mean Crystal Particle Size (nm) | | 70 | 80 | 70 |

The average linear thermal expansion coefficient was determined, using a Fizeau interferometer for precision expansion measurement. The shape of the test sample is columnar, having a diameter of 30 mm and a length of about 27 mm. The method is as follows: An optical plate is kept in contact with both edges of the sample in order that interference fringes could be observed with an HeNe laser, and the sample is put into a temperature-controllable furnace. Next, the temperature of the sample is varied, and the change of the interference fringes is observed whereby the change of the sample length that varies depending on the sample temperature is profiled. In the actual test, the sample was analyzed under two conditions, or that is, heating condition and cooling condition. The change of the sample length under the two conditions was determined, and the data were averaged to be ΔL.

The average linear thermal expansion coefficient is computed according to the following formula, in which a indicates the average linear thermal expansion coefficient, ΔT indicates the test temperature range, and L indicates the length of the test sample. α(° C.$^{-1}$) is as follows:

$$\alpha = (\Delta L/L)/\Delta T.$$

The transmittance was measured, using Hitachi's U-4000. The thickness of the test sample was 10 mm. The wavelength for 5% and 80% spectral transmittance is shown in the Tables.

The spectral transmittance includes surface reflection loss.

As in Tables 1 to 4 and FIGS. 1 and 2, Examples of the crystallized glass of the invention had a crystal particle size of at most 90 nm and had a fine structure. In addition, the thermal expansion characteristics of these samples were such that the average linear thermal expansion coefficient thereof was at most 0±0.5 within a range of from 0° C. to 50° C. Further, the number of the bubbles remaining in the glass was from 2 to 24/cm$^3$, and this indicates that the clearness of the crystallized glass of the invention is comparable to that of the glass containing an antimony component or an arsenic component of Comparative Examples.

The crystallized glass of Examples had a heat conductivity of from 1.6 to 1.8 W/(m·K) and had a Young's modulus of from 90 to 93 GPa.

Regarding the light transmittance thereof, the crystallized glass of the invention contains an SnO$_2$ component and/or a CeO$_2$ component that may be a coloring component for glass, and the wavelength for 80% transmittance through the glass having a thickness of 10 mm is at most 440 nm. This means that the transparency of the crystallized glass of the invention is comparable to that of conventional glass.

As mentioned hereinabove, the crystallized glass of the invention is applicable to masks for lithography, optical reflection mirrors, parts of semiconductor production devices such as wafer stages and reticular stages, parts of liquid-crystal exposure devices, parts of large-size reflection mirrors, as well as to other various precision members such as parts of standard scales, prototypes and testers. Further, as having high transparency, the glass ceramics of the invention are usable in various applications that require high optical transmittance, for example, as substrates for optical filters, and transmission masks for lithography. In addition, the glass ceramics of the invention are applicable to other various members and parts, as having high mechanical strength, and they may be effectively worked for weight reduction.

What is claimed is:

1. Crystallized glass comprising, in terms of percent by mass of oxide:
   SiO$_2$ component (as oxides) from 50 to 62%,
   Al$_2$O$_3$ component (as oxides) from 22 to 26%,
   at least one of SnO$_2$ component (as oxide) and CeO$_2$ component (as oxide),
   wherein SnO$_2$ from 0.01 to 5.0% and/or CeO$_2$ from 0.01 to 5.0%
   P$_2$O$_5$ component (as oxides) from 5 to 10%,
   Li$_2$O component (as oxide) from 0 to 5%,
   MgO component (as oxide) from 0 to 4%,
   ZnO component (as oxide) from 0 to 4%,
   CaO component (as oxide) from 0.3 to 4%, and
   BaO component (as oxide) from 0 to 4%,
   wherein the crystallized glass contains neither of As$_2$O$_3$ component (as oxide) and Sb$_2$O$_3$ component (as oxide).

2. Crystallized glass as claimed in claim 1, which contains the Li$_2$O component (as oxide).

3. Crystallized glass as claimed in claim 1, which contains β-quartz (β-SiO$_2$) and/or β-quartz solid solution (β-SiO$_2$ solid solution) as the main crystal phase thereof.

4. Crystallized glass as claimed in claim 1, wherein the mean crystal particle size of the main crystal phase is within a range of from 5 to 200 nm.

5. Crystallized glass as claimed in claim 1, wherein the maximum temperature in thermal treatment for crystallization is from 750 to 850° C.

6. Crystallized glass as claimed in claim 1, of which the average linear thermal expansion coefficient within a temperature range of from 0 to 50° C. is within 0.0±0.5 ($10^{-7}$° $C.^{-1}$) and (maximum value−minimum value) of ΔL/L is within a range of $10 \times 10^{-7}$.

7. Crystallized glass as claimed in claim 1, wherein the wavelength for 80% light transmittance through the glass having a thickness of 10 mm is at most 680 nm.

8. Crystallized glass as claimed in claim 1, further comprising, in terms of percent by mass of the oxide:
$TiO_2$, from 1 to 4% and/or
$ZrO_2$, from 1 to 4%.

9. Crystallized glass as claimed in claim 8, wherein the ratio of the $P_2O_5$ component to the $SiO_2$ component and to the $Al_2O_3$ component is as follows, in terms of percent by mass of the oxide:
$P_2O_5/SiO_2$, from 0.1230 to 0.1450;
$P_2O_5/Al_2O_3$, from 0.270 to 0.330.

10. Crystallized glass as claimed in claim 8, wherein the content of the $SiO_2$ component, the $Al_2O_3$ component and the $P_2O_5$ component is as follows, in terms of percent by mass of the oxide:
$SiO_2+Al_2O_3+P_2O_5$=from 85.0 to 89.0%.

11. Crystallized glass as claimed in claim 1, which does not substantially contain PbO, $Na_2O$ and $K_2O$ components (as oxides).

12. Crystallized glass as claimed in claim 1, which contains at least one or more components selected from a fluoride component, a sulfate component, a chloride component, an $MnO_2$ component (as oxide), a $WO_3$ component (as oxide), a $Ta_2O_5$ component (as oxide) and an $Nb_2O_5$ component (as oxide).

13. A part of precision instruments, comprising crystallized glass of claim 1.

14. The crystallized glass of claim 1, wherein the crystallized glass is included in a mask for lithography.

15. The crystallized glass of claim 1, wherein the crystallized glass is included in an optical reflection mirror for lithography.

16. The crystallized glass of claim 1, wherein the crystallized glass is included in a wafer stage or reticule stage for lithography.

* * * * *